US007080578B2

(12) United States Patent
Izumisawa

(10) Patent No.: US 7,080,578 B2
(45) Date of Patent: Jul. 25, 2006

(54) HAND TOOL WITH IMPACT DRIVE AND SPEED REDUCING MECHANISM

(75) Inventor: Osamu Izumisawa, Tokyo (JP)

(73) Assignee: SP Air Kabusiki Kaisha Corporation, Tokyo (JP)

( * ) Notice: Subject to any disclaimer, the term of this patent is extended or adjusted under 35 U.S.C. 154(b) by 75 days.

(21) Appl. No.: 10/938,312

(22) Filed: Sep. 10, 2004

(65) Prior Publication Data

US 2006/0053979 A1 Mar. 16, 2006

(51) Int. Cl.
*B25B 13/46* (2006.01)
*B25B 7/15* (2006.01)
*B23B 45/04* (2006.01)
*B27C 3/08* (2006.01)

(52) U.S. Cl. ............................ 81/57.39; 81/57; 81/60; 173/168

(58) Field of Classification Search ............... 81/57.39, 81/57, 57.3, 58, 60–63; 173/168, 93.5, 170
See application file for complete search history.

(56) References Cited

U.S. PATENT DOCUMENTS 3,389,623 A 6/1968 Gill
3,977,278 A * 8/1976 Jackson ..................... 81/57.11
4,191,264 A 3/1980 Antipov et al.
4,346,630 A 8/1982 Hanson
4,505,170 A 3/1985 Van Laere
4,821,611 A * 4/1989 Izumisawa ................... 81/464
RE33,711 E * 10/1991 Ono et al. ..................... 81/464
5,199,505 A 4/1993 Izumisawa
5,784,934 A * 7/1998 Izumisawa ................. 81/57.26
5,918,686 A 7/1999 Izumisawa
6,158,528 A * 12/2000 Izumisawa .................. 173/168
6,279,714 B1 * 8/2001 Hsu ........................ 192/223.2
6,311,583 B1 11/2001 Izumisawa
6,401,572 B1 * 6/2002 Provost ..................... 81/57.14
6,443,239 B1 9/2002 Izumisawa
6,487,940 B1 * 12/2002 Hart et al. ................. 81/57.14
6,568,298 B1 5/2003 Zinck
6,578,643 B1 * 6/2003 Izumisawa ................... 173/47
6,695,072 B1 * 2/2004 Izumisawa .................. 173/163
6,923,095 B1 * 8/2005 Horvath ..................... 81/57.39
2003/0024715 A1 * 2/2003 Izumisawa .................. 173/104
2003/0150298 A1 * 8/2003 Kusama ..................... 81/57.39

* cited by examiner

*Primary Examiner*—Lee D. Wilson
*Assistant Examiner*—Alvin J. Grant
(74) *Attorney, Agent, or Firm*—Senniger Powers

(57) ABSTRACT

A power driven tool useful for tightening and loosening a mechanical fastener includes an impact mechanism. Preferably, the tool is pneumatic and includes a ratchet head and an impact device for providing additional torque to the ratchet head. A planetary reduction gear reduces the high output speed of a pneumatic motor for input into the impact device and reduces wear on the impact device.

23 Claims, 7 Drawing Sheets

HAND TOOL WITH IMPACT DRIVE AND SPEED REDUCING MECHANISM

BACKGROUND OF THE INVENTION

This invention relates generally to power driven tools, and more specifically it relates to a power driven tool for tightening or loosening fasteners and also having an impact drive and a speed reducing mechanism.

Power driven tools for tightening or loosening fasteners (e.g., nuts and bolts) are known, and power driven tools incorporating impact drives that can intermittently provide an increased amount of torque for tightening or loosening fasteners are common. In a typical tool, a motor and motor shaft rotate an output shaft for turning the fastener. The impact drive is generally positioned between the motor shaft and output shaft to provide the increased torque as necessary. However, because the impact drives of these tools generally operate at the same rate as the motor, they can prematurely wear out before other components of the tool and can possibly leave the tool unusable.

An impact wrench incorporating a ratchet head is disclosed in co-owned U.S. Pat. No. 4,821,611 (Izumisawa). A pneumatic motor rotates a clutch case that coaxially houses an impact drive. Under normal operation, a cam ball fixed within the clutch case engages a finger of an impact clutch and rotates the clutch conjointly with an output shaft for tightening or loosening the fastener. But when frictional resistance of the fastener exceeds the normal torque output of the tool, the cam ball slides under the impact clutch finger and pushes the clutch axially forward along the output shaft. This conjointly moves a pair of hammers forward into registration with a corresponding pair of anvils of the output shaft. The hammers instantaneously impact the anvils and produce an increased amount of torque in the output shaft for overcoming the frictional resistance of the fastener. Immediately following the impact, the hammers retreat axially rearward and when the cam ball makes one full rotation with the clutch case, the impact process repeats.

However, the clutch case and cam ball generally move at a rate equal to the output speed of the motor, which is very high for pneumatic motors. Therefore when the output shaft is unable to turn the fastener, the cam ball repeatedly pushes the impact clutch and hammers axially forward at a similar rate. This often occurs so rapidly that the hammers impact the anvils before corresponding surfaces fully register, or alternatively the hammers completely miss the anvils and fail to produce any additional torque. Moreover, when the frictional resistance of the fastener exceeds the additional torque produced by the hammers, the cam ball and impact clutch may unnecessarily push the hammers into repeated registration with the anvils before an operator can disengage the motor. This can be hard on components of the impact drive (e.g., the cam ball and impact clutch) and may damage them or prematurely wear them out before other components of the wrench.

Co-owned U.S. Pat. No. 5,199,505 (Izumisawa) also discloses an impact wrench. But here, a direct drive socket head is incorporated into the wrench. The impact drive of this wrench is similar to that of U.S. Pat. No. 4,821,611 and effectively provides increased torque to an output shaft when necessary for tightening or loosening a fastener. But as was previously described for the impact wrench of U.S. Pat. No. 4,821,611, the impact drive of this wrench operates at the same rotational speed as the motor and is susceptible to producing excess, unnecessary impacts that can prematurely wear out components of the drive.

Speed reducing mechanisms, such as reduction gears have been used to reduce rotational speed of tool motors. However, these tools tend to be direct drive and do not have the advantages of a ratchet head. Moreover, these tools may use externally connected gears that can be relatively large. This can require the tools to have larger housings that cannot be held in one hand. An impact wrench incorporating a speed reducing mechanism is disclosed in U.S. Pat. No. 4,505,170 (Van Laere). The wrench includes a high speed electric motor (powered by an external electric current source, such as an auto battery) for turning a direct drive head. The speed reducing mechanism is located between the motor and impact drive and is necessary to accommodate the high speeds generated by the motor when it operates the impact drive. (For example, the speed reducing mechanism reduces breaking power on the motor generally caused by the high speed impacts delivered by the impact drive, which can result in lost lever force to the fastener. The output of Van Laere's impact device directly drives the lug and does not obtain any additional mechanical advantage or speed reduction.

Van Laere's impact drive is generally intended for use only for removing severely jammed fasteners (e.g., nuts on auto tires). In particular, Van Laere discloses that an operator can disengage the impact drive for normal, hobby-type work. Accordingly, the impact drive in Van Laere is not intended for continuous use and should not prematurely wear out. Moreover, Van Laere's speed reducing mechanism generally includes externally contacting gears that transfer axial rotation of the motor away from a common axis of the motor shaft and output shaft to reduce the rotational speed. These gears tend to be large in order to adequately reduce the high rotational speed of the motor by an acceptable amount. Therefore, the housing must also be larger.

Therefore, it would be desirable to incorporate an efficient speed reducing mechanism into a power driven tool having an impact drive. This could advantageously control rotational speed of the motor and could thus control the impact rate of the hammers of the impact drive. Accordingly, components of the impact drive could be less prone to damage and wear, and may last longer, while still providing increased torque to the output shaft when necessary.

SUMMARY OF THE INVENTION

This invention relates generally to a power driven tool for tightening or loosening a mechanical fastener. The tool generally comprises a housing with a motor disposed in the housing. The motor includes a motor shaft adapted to be rotated by the motor at a first higher speed. A reduction gear located in the housing is operatively connected to the motor shaft and includes a reduction gear shaft adapted to be rotated by the reduction gear at a second lower speed that is slower than the rotation of the motor shaft. An impact drive is also disposed in the housing and is operatively connected to the reduction gear shaft. The impact drive has an output shaft disposed for rotation and is adapted for intermittently providing an increased torque on the output shaft. A ratchet head assembly is operatively connected to the output shaft of the impact drive. The assembly includes an output member rotatably mounted on the housing and capable of engaging the mechanical fastener. The assembly also includes a ratchet mechanism operable to limit rotation of the output member in one direction.

In another aspect of the invention, the tool comprises a housing with first and second longitudinal ends and a longitudinal axis. A head is attached to the housing toward the first longitudinal end for operatively engaging the mechanical fastener, and a motor and motor shaft are disposed in the housing toward the second longitudinal end for driving the head. The tool additionally comprises a planetary reducing gear between the motor and the head for reducing rotational speed of the motor transferred to the head. Planetary gears of the gear train receive the motor shaft of the motor and conjointly rotate therewith inside a sun gear, thus reducing the rotational speed of the motor. An impact drive is operatively provided between the planetary reduction gear and the head for selectively increasing the driving force to the head when necessary for tightening or loosening the mechanical fastener.

In still another aspect of the invention, the housing of the tool is elongate and tubular and is sized for being held in one hand. A pneumatic motor provided in the housing includes a motor shaft adapted to be rotated by the motor at a first higher speed. A planetary reduction gear operatively connects to the motor shaft and includes a reduction gear shaft adapted to be rotated by the reduction gear at a second lower speed that is slower than the rotation of the motor shaft. An impact drive is further provided in the housing operatively connected to the reduction gear shaft. The impact drive has an output shaft disposed for rotation relative to the housing. The impact drive is adapted for intermittently providing an increased torque on the output shaft. The motor shaft, the reduction gear shaft and the output shaft are generally coaxial. A ratchet head assembly is operatively connected to the output shaft of the impact drive. It includes an output member rotatably mounted on the housing and capable of engaging the mechanical fastener and a ratchet mechanism operable to limit rotation of the output member in one direction.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
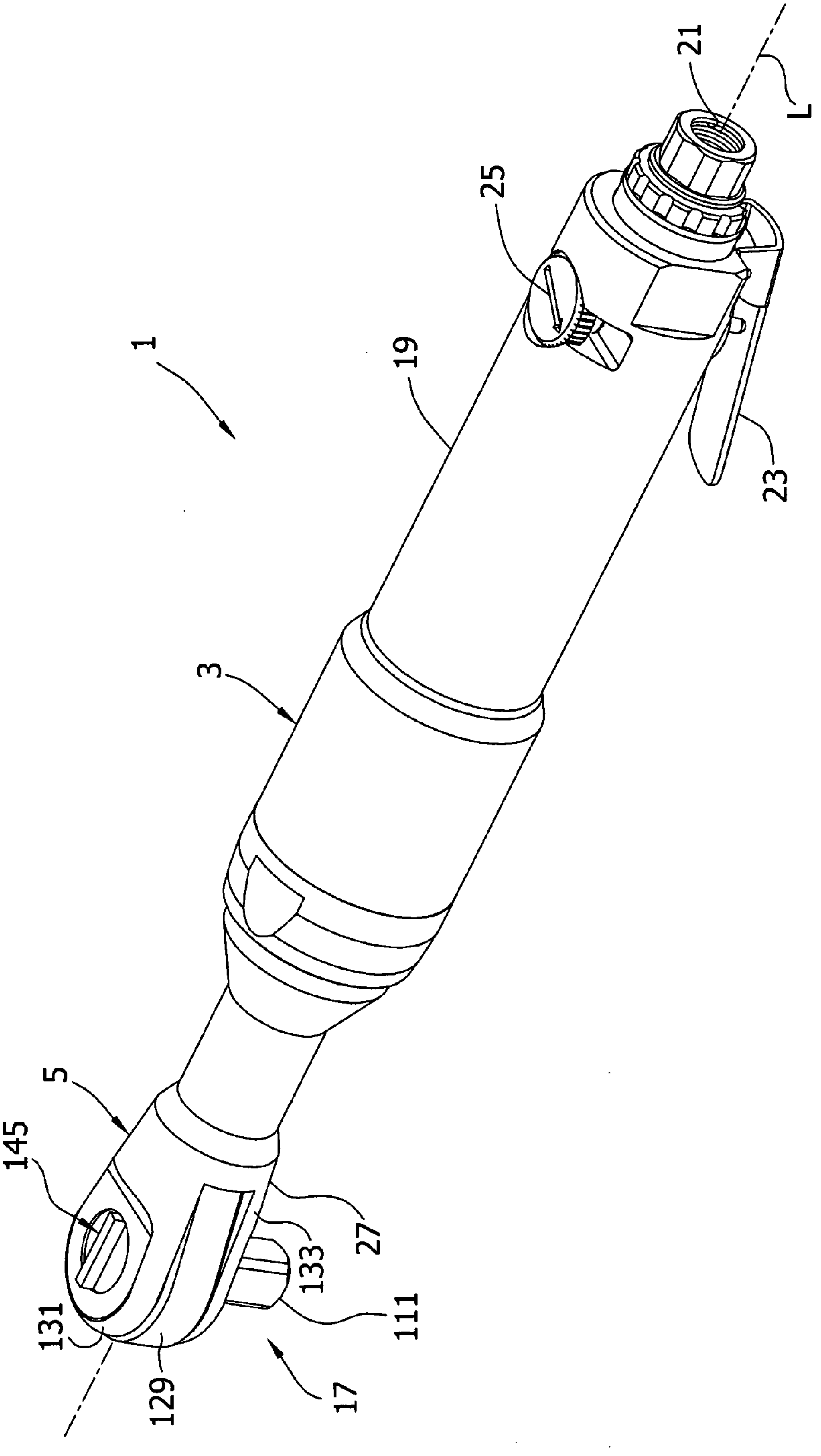
FIG. 1 is a perspective of a hand held pneumatic ratchet wrench of the invention incorporating an impact drive, a planetary reduction gear, and pneumatic motor.
Figure 2:
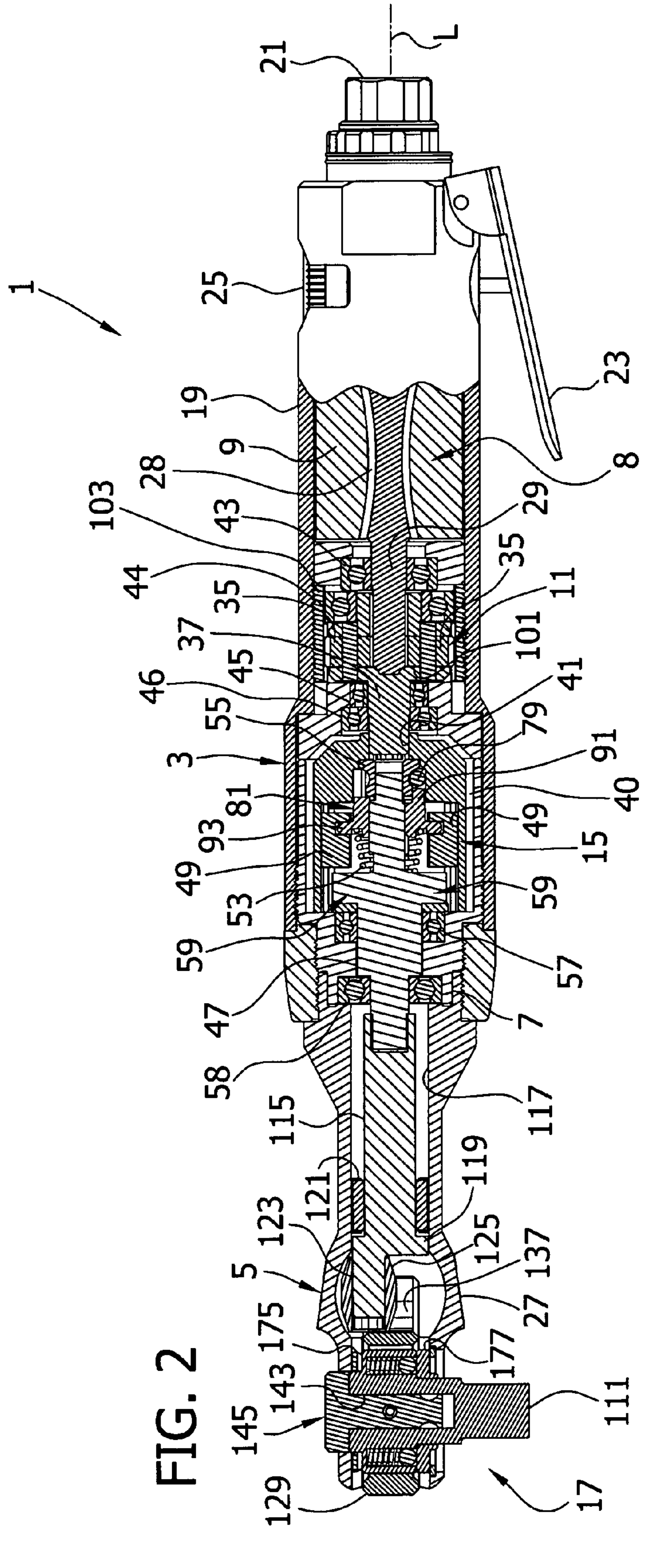
FIG. 2 is an elevation of the wrench of FIG. 1 with a portion in longitudinal section to show internal construction.

Referring now to the drawings, and particularly to FIGS. 1 and 2, a hand-held power driven ratchet wrench is generally indicated at reference numeral 1. The wrench 1 includes a tubular housing, shown generally at 3, and a head, indicated generally at 5. As shown in FIG. 2, the housing 3 and head 5 are connected by a threaded internal coupling 7 and securely encase the operative components of the wrench 1, including a motor, generally indicated at 8, having a rotor 9. The housing 3 also contains a planetary reduction gear 11, an impact drive 15, and a ratchet mechanism 17 (the reference numerals designating their subjects generally). Each of these components will be described in greater detail hereinafter. For convenience of description, when describing orientation of these components, the head 5 is understood to be located toward a forward end of the wrench 1 and the motor 8 toward a rearward end. The motor 8 illustrated and described herein is a standard air driven motor of the type commonly used in pneumatic tools.

Referring to FIG. 1, the housing 3 generally includes a handle 19 having a rearward longitudinal end and a forward longitudinal end. An air inlet fitting 21 is located toward the rearward end of the housing 3 and is capable of connecting the wrench 1 to an external source of pressurized air (not shown). A lever 23 and a control dial 25 provided near the air inlet fitting 21 control the airflow to the motor 8. The lever 23 is pivotally mounted on the housing 3 and is spring biased to a radially outward position with respect to the housing so that it can be squeezed to actuate a valve (not shown) to selectively permit pressurized air to flow through the air inlet fitting 21 to the motor 8.

Figure 3:
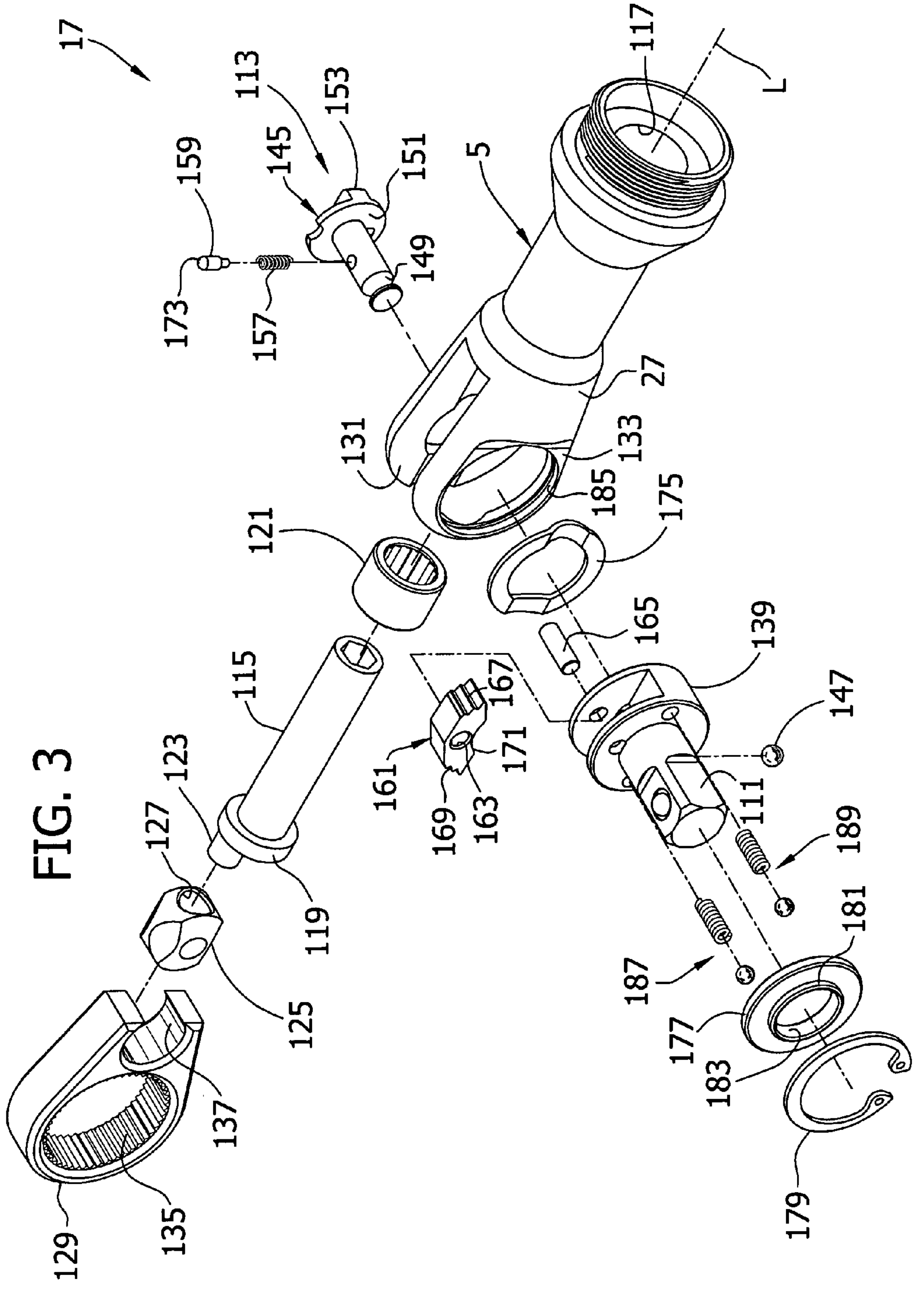
FIG. 3 is an exploded perspective of a head of the wrench incorporating a ratchet mechanism.

Referring to FIGS. 1–3 together, the ratchet head assembly 17 is located toward a forward end of the wrench 1, generally at the head 5, and is supported within a yoke 27 of the head. The illustrated ratchet head assembly 17 is similar to that shown in U.S. Pat. No. 4,346,630 (Hanson) and generally includes an output member 111 rotatably mounted on the housing 3 for engaging the mechanical fastener, and a ratchet mechanism, generally designated 113, operable to limit rotation of the output member in one direction.

A crank shaft 115 operatively connects the impact drive output shaft 47 (via a hexagonal connection) to the ratchet mechanism 113 for converting rotary motion of the output shaft into oscillating motion of the ratchet mechanism. The crank shaft 115 is located within a bore 117 of the head 5. A flange 119 of the crank shaft 115 rests on top of a needle bearing 121 fitted within the bore 117, supporting the crank shaft 115 for axial rotation within the head 5 conjointly with the output shaft 47. A crank 123 extends from the flange 119 and is off-center from the center of the shaft 115. A drive bearing 125 having generally spherical shaped sides and opening 127 rotatably receives the crankshaft's crank 123 (FIG. 2). An oscillating member 129 of the ratchet mechanism 113 is located between arms 131 and 133 of the yoke 27 of the head 5. A toothed opening 135 in the oscillatory member 129 generally aligns with openings in the arms 131, 133 of the yoke 27 for receiving components of the ratchet mechanism 113, as will be described hereinafter. The drive bearing 125 slidably fits in a semicircular opening 137 of the oscillating member 129. As the crank 123 rotates, the drive bearing 125 moves in a circular motion within the oscillatory member's semicircular opening 137, causing the member 129 to rock back and forth about a longitudinal axis of the output member 111.

The ratchet mechanism 113 generally includes a rotary member 139 sized to fit in the aligning openings of the yoke arms 131, 133 and oscillatory member 129. The rotary member 139 has a generally circumferential slot 141 in it extending through about half of the circumference of the rotary member. The output member 111 extends laterally outward from the rotary member 139. Opposite the output member 111 in the rotary member 139 is an axial bore 143, which intersects the bottom of the circumferential slot 141 as best shown in FIG. 2. A setting member 145 for setting rotational direction of the ratchet head assembly 17 (e.g., clockwise or counterclockwise) is received within the axial bore 143 (secured by ball bearing 147 in groove 149) and includes a disc 151 having a fingerpiece 153 extending from one side to allow it to be manually rotated. The setting member 145 has an extending shaft 155 with a transverse bore therein receiving a spring 157 for biasing a plunger 159.

The ratchet mechanism 113 also includes a ratchet pawl, designated generally at 161, for controlling rotational direction of the ratchet head assembly 17. The pawl 161 has a transverse bore 163 through it so that it can be mounted in the circumferential slot 141 in the rotary member 139 by way of inserting a pin 165 through the sides of the pawl and the sides of the rotary member. The pawl 161 has slanted or generally arcuate end parts as designated at 167 and 169. These portions have teeth that are configured to engage with the teeth on the inside of the opening 135 of the oscillatory member 129. The pawl 161 has a groove or channel 171 formed in one longitudinal side for pivoting on the pin 165 when pushed by a free end 173 of the plunger, which is held against the pawl by the spring 157. Thus, it may be seen that by manually rotating the setting member 145 by means of the fingerpiece 153, the setting member shaft can be rotated angularly, which rotates the plunger 159 within the channel 171 of the pawl 161. In a first position, the pawl 161 is positioned to be rotated by the oscillatory member 129 angularly in one direction (e.g., clockwise). In a second position, the pawl 161 is positioned to be rotated by the oscillatory member 129 angularly in the opposite direction (e.g., counterclockwise). Each end of the ratchet pawl 161 operates only in one direction, and is free to move in a direction opposite to that direction.

The rotary member 139 is held in the yoke 27 of the head 5 on one side by a thrust washer 175, which is generally resilient and made of a spring material. The thrust washer 175 has waves, or bends in it in a circumferential direction so that it can be pressed between the rotary member 139 and yoke 27, holding them together. On the other side of the head 5, the rotary member 139 is held in place within the yoke 27 by a plate 177 and snap ring 179. The plate 177 has an extending circular boss 181, holding the snap ring 179, and a center bore 183 fitting over the output member 111. The plate 177 fits into the opening of one arm 133 of the yoke 27 and is held in place by the snap ring 179 fit into an undercut 185 in the yoke arm opening. Spring loaded ball bearings (each designated generally by 187 and 189) apply force to hold the plate 177, thrust washer 175, and rotary member 139 in place. It is to be understood that a wrench with a head having a different mechanism for engaging fasteners, for example a direct drive socket head, does not depart from the scope of the invention.

In operation, the output shaft 47 rotates the crank shaft 115 and drive 125, causing the oscillating member 129 to pivot about the longitudinal axis of the output member 111. When oriented for turning a fastener in a clockwise direction, the pawl is pivoted on plunger 159 so that pawl end part 169 engages the opening 135 of the oscillating member 129. The oscillating member 129 first moves clockwise when the crank shaft 115 and drive 125 rotate. The teeth of the opening 135 of the oscillating member 129 engage the teeth of the pawl end part 169 and cause the rotary member 139 to rotate clockwise with the oscillating member. This also rotates the fastener clockwise. After the crank shaft 115 rotates one half rotation (i.e., rotates 180°), the drive 125 causes the oscillating member 129 to reverse rotation and rotate counterclockwise. The teeth of the oscillating member's opening 135 disengage the teeth of the pawl end part 169 and slide past each other. Here, the rotary member 139 does not move. Once the crank shaft 115 rotates another one half rotation, the drive 125 again causes the oscillating member 129 to reverse rotation back in a counterclockwise direction. This causes the teeth of the oscillating member's opening 169 to re-engage the teeth of the pawl end part 169 and rotate the rotary member 139, further turning fastener again. The process repeats until the motor 8 is disengaged. Operation is similar for turning a fastener in a counterclockwise direction, with the exception that the pawl end part 167 (instead of end part 169) engages the teeth of the oscillating member's opening 135 so that the fastener can be turned in the opposite direction (i.e., counterclockwise).

Figure 4:
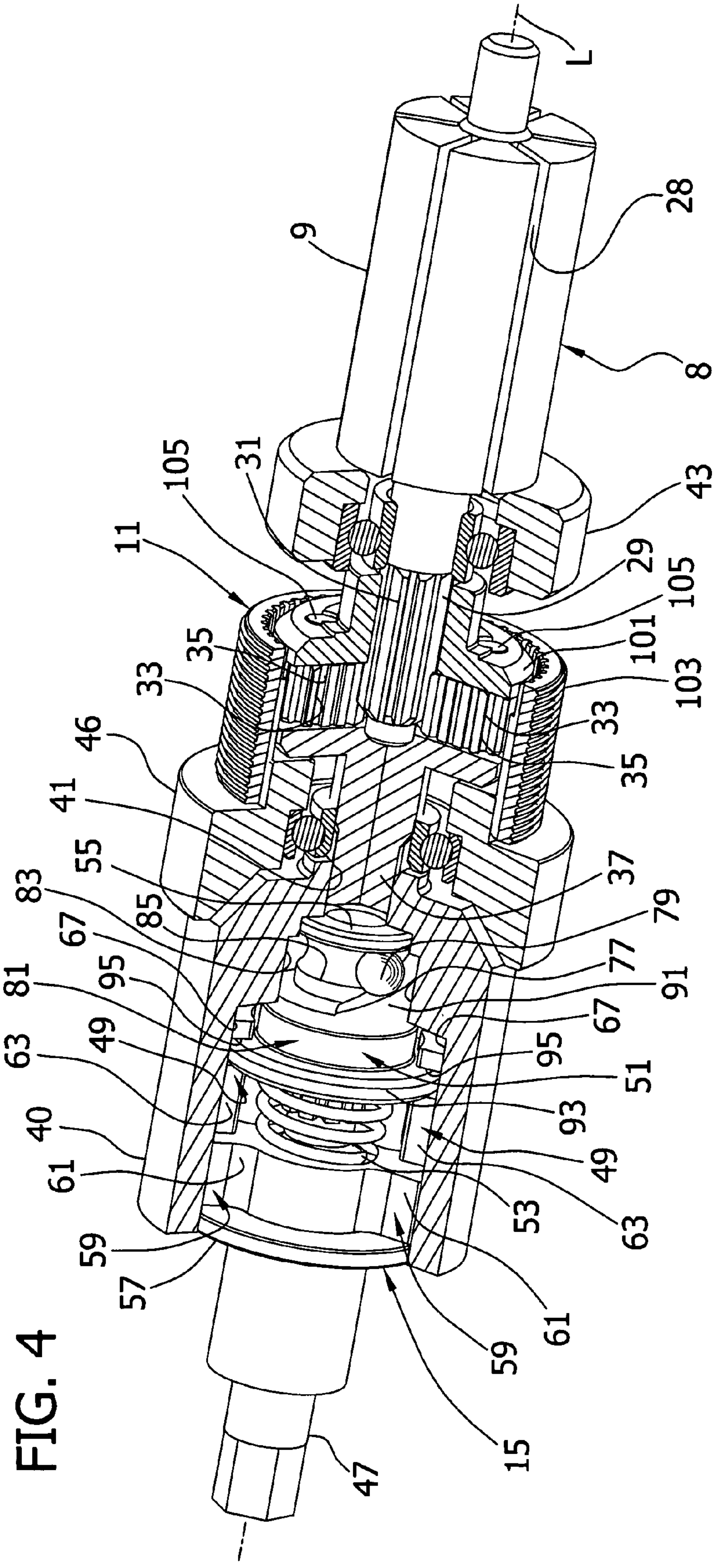
FIG. 4 is a perspective of a drive train of the pneumatic ratchet wrench with part of the planetary reduction gear and impact drive broken away to show internal construction.
Figure 5:
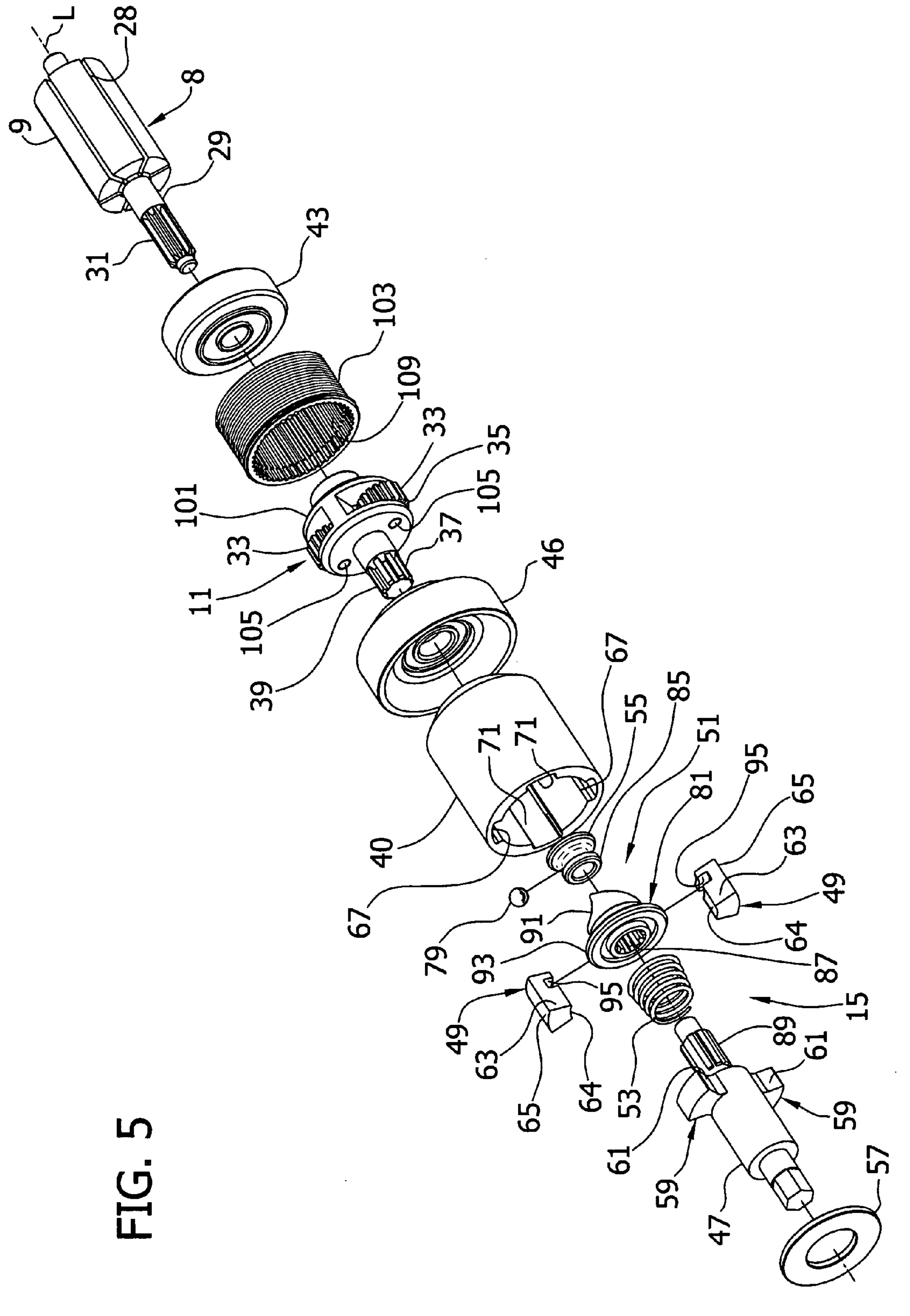
FIG. 5 is an exploded perspective of the drive train of FIG. 4.

As previously described, the pneumatic motor 8 is disposed generally in the housing 3 toward the housing's rearward end. As shown in FIGS. 2, 4, and 5, the rotor 9 includes vanes 28 and has motor shaft 29 positioned generally coaxially with a longitudinal axis L of the wrench (FIG. 1) and extending longitudinally forward from the rotor 9 toward the head 5. Splines 31 at a forward end of the motor shaft 29 mesh with splines 33 of two planetary gears (each planetary gear indicated generally at 35) of the planetary reduction gear 11. A reduction gear shaft 37 (see also FIG. 7) of the planetary reduction gear 11 is positioned coaxially with the motor shaft 29 and extends longitudinally forward from the reduction gear 11. Splines 39 at a forward end of the reduction gear shaft 37 mesh with internal splines (not shown) of an opening 41 at a rearward end of a clutch case 40 of the impact drive 15. Bearings 43 and 44 are fitted between the motor 8 and the planetary reduction gear 11 and bearings 45 and 46 are fitted between the reduction gear 11 and impact drive 15, respectively, for supporting axial rotation of the motor shaft 29 and reduction gear shaft 37 (see FIG. 2).

The impact drive 15 of the wrench 1 illustrated and described herein is similar to that shown in co-owned U.S. Pat. No. 5,199,505 (Izumisawa), the entire disclosure of which is hereby incorporated by reference. The illustrated impact drive 15 has components supported generally within the clutch case 40 (FIG. 4) and incorporates an output shaft 47, two substantially identical hammers (each indicated generally at 49), an impact clutch indicated generally at 51, and a coil spring 53. The output shaft 47 is centrally positioned within the clutch case 40, generally coaxially with a longitudinal axis of the housing 3, which aligns with the longitudinal axis L of the wrench (see FIG. 2), and can rotate independently of the clutch case 40. The output shaft 47 is also generally coaxial with the motor shaft 29 and the reduction gear shaft 39. The output shaft 47 extends through (without a spline connection) a race 55 at the rearward end of the clutch case 40 and is supported by bearings 57 and 58 at the forward end. Two substantially identical wedge-shaped anvils (each shown generally at 59) are formed as one piece with the output shaft 47 and project radially outward therefrom in opposite directions. Each anvil 59 has two impact surfaces 61 (only one surface of each is visible in the drawings) that engage respective striking surfaces 63 of the hammers 49 (again only one surface of each is visible in the drawings) when the hammers move to provide additional torque to the output shaft 47. It is understood that a wrench having differently shaped anvils or hammers does not depart from the scope of the invention.

Figure 6:
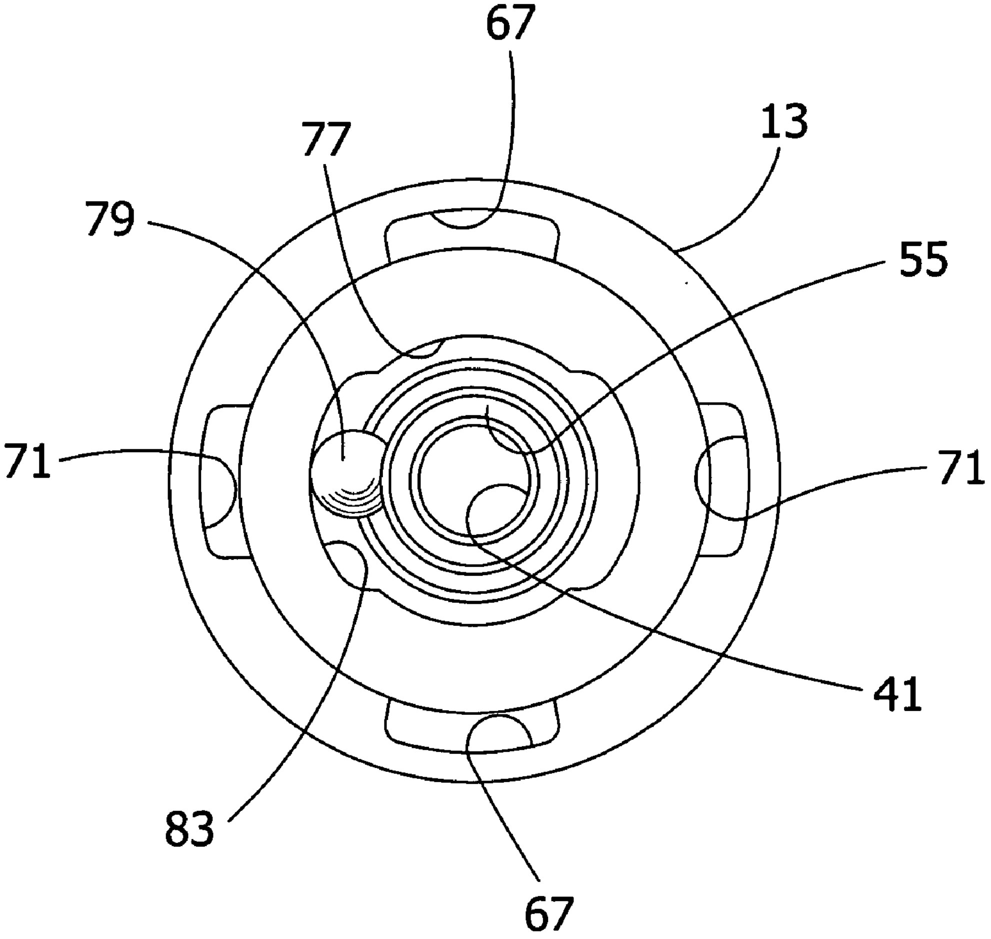
FIG. 6 is an enlarged top plan of the impact drive with an output shaft, hammers, and impact clutch removed.

The hammers 49 of the impact drive 15 are generally wedge-shaped and each includes the two lateral, generally flat, striking surfaces 63 and slightly arcuate inner and outer surfaces 64 and 65, respectively. The particular impact surface 61 and striking surface 63 that engage during operation depend upon the direction of rotation of the clutch case 40 (i.e., whether the wrench 1 is tightening or loosening a fastener). The hammers 49 are partially received in two opposing, axially extending guide channels 67 formed in an inner wall of the clutch case 40 (see FIG. 6). Two additional channels 71 are formed in the clutch case 40 but are not sized to receive hammers 49. The guide channels 67 are shaped for a close sliding fit with the hammers 49 and substantially restrict the hammers to forward and rearward longitudinal movement within the channels. The guide channels 67 and the hammers 49 both have generally trapezoidal transverse cross sections that taper radially inward toward a central longitudinal axis of the clutch case 40 (which aligns with the longitudinal axis L of the wrench 1). When the hammers 49 are positioned in the guide channels 67, the striking surfaces 63 generally lie in radial planes that intersect at the longitudinal axis of the clutch case 40. The guide channels 67 additionally have generally opposing side walls 73 connected by a transverse outer wall of the clutch case 40 (see FIG. 6). The side walls 73 of the guide channels 67 slope inwardly toward each other from their intersection with the outer wall of the clutch case 40 and thus are capable of holding the wider portion of the partially engaged respective hammer 49 captive within the channel 67, preventing radial and lateral movement of the hammer out of the channel.

As also shown in FIGS. 2, 4, and 5, the impact clutch 51 is generally positioned within a recess 77 (FIG. 4, see also FIG. 6) of the clutch case 40, toward a rearward end of the case, and includes the race 55, a cam ball 79, and a cam follower shown generally at 81. The race 55 is positioned coaxially with the output shaft 47 along the longitudinal axis of the clutch case 40, and a radial outer surface of the race defines an inner wall of a raceway 83 within the clutch case recess 77 (see also FIG. 6). The radially outer surface of the race 55 is generally concave in conformance with the shape of the cam ball 79. In this position, the cam ball 79 is capable of restricted movement relative to the clutch case 40 within the respective raceway 83, while a lip 85 at the forward end of the race 55 holds the cam ball 79 against axial movement forward of the clutch case 40.

The cam follower 81 of the impact clutch 51 is generally tubular in shape and is located forward of the race 55. The cam follower 81 is positioned generally coaxially with the race 55 and output shaft 47 along the longitudinal axis of the clutch case 40. The cam follower 81 is connected to the output shaft 47 by internal splines 87, which mesh with external splines 89 on the output shaft 47 (FIG. 5). This allows the output shaft 47 to rotate conjointly with the cam follower 81 and also allows the cam follower to freely slide longitudinally along the output shaft for moving the hammers 49 into and out of registration with the anvils 59. The cam follower 81 includes a longitudinally extending finger 91 that is generally triangular in shape and is arcuately bent slightly out of plane so that it aligns with the circumference of the cam follower 81. The finger 91 projects rearwardly into the raceway 83 where it would be entirely free to rotate within the clutch case 40 but for the presence of the cam ball 79 (FIG. 4). A rim 93 of the cam follower 81 is located forward of the finger 91 and fits into arcuate notches 95 formed in the radially inwardly facing surfaces 64 of the hammers 49, linking the hammers to the cam follower 81 for actuating their forward and rearward axial movements along the output shaft 47.

The connection between the splines 87 and 89 of the cam follower 81 and output shaft 47, respectively, holds the cam follower 81 and output shaft 47 in a predetermined rotational orientation and causes the output shaft and cam follower to rotate conjointly. The cam follower finger 91 is located by the interconnection of the splines (87 and 89) substantially under one of the anvils 59 of the output shaft 47. The coil spring 53 of the impact drive 15 is positioned generally around a rearward end of the output shaft 47 and is compressed between rearward surfaces of the anvils 59 and a forward, grooved surface of the cam follower 81. The spring 53 biases the cam follower 81 and hammers 49 rearwardly, away from the anvils 59, and establishes a preset compressive resistance that must be overcome to move the hammers 49 axially forward and into registration with the anvils 59.

Figure 7:
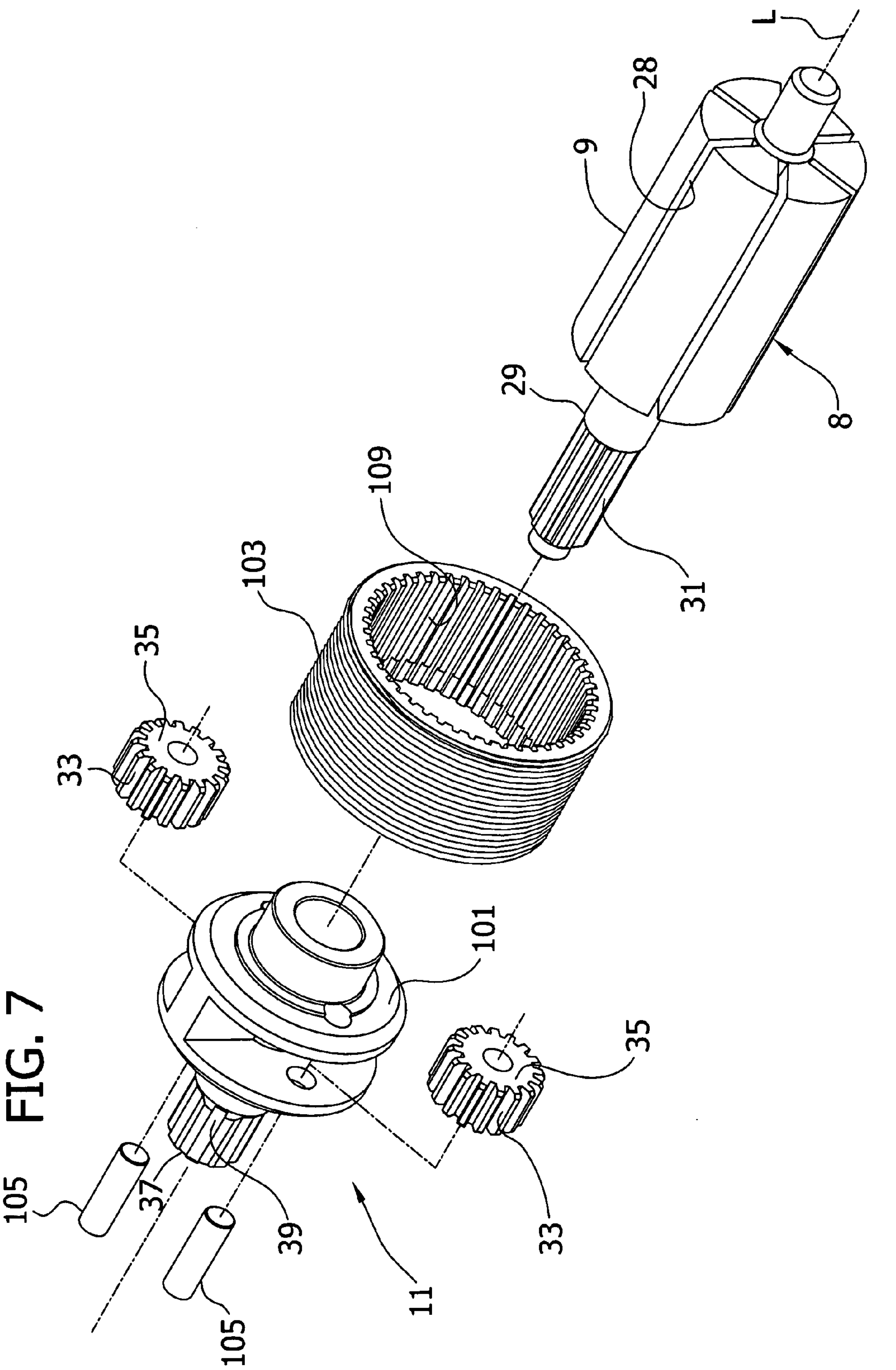
FIG. 7 is an exploded perspective of the planetary reduction gear and rotor of the pneumatic motor.

The planetary reduction gear 11 of the invention is shown in FIGS. 2, 3–5, and 7. It is positioned generally coaxially with the longitudinal axis L of the wrench 1, between the motor 8 and the clutch case 40, and generally includes the two planetary gears 35, a planetary frame 101, a sun gear 103 fixed to the housing 3, and the reduction gear shaft 37. The planetary gears 35 are connected to the frame 101 by pins 105 for rotation about their centers (FIG. 7). The reduction gear shaft 37 is attached to a forward end of the frame 101 for rotation with the frame. The splines 33 of the planetary gears 35 mesh with internal splines 109 of the sun gear 103. As previously described, the external splines 31 at the forward end of the motor shaft 29 mesh with the external splines 107 of the planetary gears 35. Driven rotation of the motor shaft 29 causes both planetary gears 35 to rotate about their respective pins 105. The splined connection of the planetary gears 35 to the sun ring 103, which is fixed rotationally relative to the housing 3, causes the planetary gears to travel around the inner circumference of the sun gear. Because the planetary gears 35 are connected by pins 105 to the frame 101, the frame turns about a central axis coaxial with the longitudinal axis L of the wrench 1 and the axis of rotation of the motor shaft 29. The frame 101 makes one rotation about the central axis every time each of the planetary gears traverse one full inner circumference of the sun gear 103. Thus, it will be appreciated that frame 101 and the reduction gear shaft 39 fixed to the frame rotate at a rate which is considerably less than the rate of rotation of the motor shaft 29.

Accordingly, the planetary reduction gear 11 reduces the incoming rotational speed of the motor 8 and transfers the reduced speed to the clutch case 40 of the impact drive 15. By operating at a rotational speed less than that of the motor 8, the impact drive 15 is able to operate more reliably with far less wear. While the illustrated planetary reduction gear includes two planetary gears, it is understood that a wrench with a planetary reduction gear having greater or less than two planetary gears does not depart from the scope of the invention.

In general operation of the wrench 1, air enters through the air inlet fitting 21 to power the pneumatic motor 8 and rotate the motor shaft 29 and planetary gears 35. The planetary reduction gear 11 reduces the rotational speed of the motor shaft 29 and transfers the reduced speed to the clutch case 40. The clutch case 40 moves the cam ball 79 in the raceway 83 until the cam ball engages a sloped side of the cam follower finger 91, causing the cam follower 81 to rotate it with the clutch case 40 and cam ball 79. The connection between splines 87 and 89 of the cam follower 81 and output shaft 47 causes the output shaft to also conjointly rotate, allowing for normal tightening or loosening operation.

When operating to tighten a fastener, the output shaft 47 is initially loaded with a small torque caused by frictional resistance of the fastener. The initial resistance is generally insufficient to overcome the preset compressive resistance of the coil spring 53, and the cam ball 79 remains engaged with the sloped side of the cam follower finger 91, rotating it and the output shaft 47 for turning the fastener. As frictional resistance of the fastener increases, torque in the output shaft 47 also increases. At this point, an axial component of a force exerted by the cam ball 79 on the cam follower finger 91 overcomes the compressive resistance of the coil spring 53 and pushes the cam follower 81 longitudinally forward. This conjointly moves the hammers 49 forward into striking position with the anvils 59, delivering an instantaneous impact to the anvils 59 that produces an additional torque in the output shaft 47 for further turning the fastener. Immediately following the impact, the cam ball 79 passes under the cam follower finger 91, and the coil spring 53 extends and moves the cam follower 81 and hammers 49 rearwardly while the clutch case 40 and cam ball 79 continue to rotate. When the cam ball 79 catches up with the cam follower 81 and again engages the cam follower finger 91, the hammers 49 again move longitudinally forward and strike the anvils 59 if sufficient resistance to turning the mechanical fastener is encountered.

It will be understood that operation for loosening a fastener is substantially similar, with the exception that the initial torque in the output shaft 47 may be larger because frictional resistance of the fastener is generally initially greater (because the fastener is already tightened). Therefore, the cam ball 79 may begin moving the cam follower 81 and hammers 49 longitudinally forward at a sooner time after engaging the motor 8.

It is envisioned that the wrench of the present invention can operate at relatively high air pressures, thus producing relatively high rotational speeds within the motor shaft of the motor. It is therefore a benefit of this wrench that the planetary reduction gear can effectively reduce rotational speed of the motor transferred from the motor shaft to the clutch case and impact drive. Fewer impacts may occur between the hammers and anvils of the impact when tightening or loosening stubborn fasteners, while still providing sufficient turning force to the fastener to accomplish the desired result. Therefore, components of the impact drive last longer without wearing out since the number of impacts is reduced.

The reduced rotational speed also ensures that when the cam follower and hammers are pushed forward by the cam ball, the hammers have sufficient time to move into registration with the anvils to deliver effective impacts for producing increased amounts of torque. Moreover at the reduced speed, it may be possible for an operator to better control the number of impacts delivered by the hammers. So when frictional resistance of the fastener exceeds the additional torque produced by the hammers, the operator has more time to react and disengage the motor before the cam ball and cam follower cause excess, unnecessary impacts. Furthermore, the illustrated planetary reduction gear is relatively compact and maintains axial rotation along a common axis when reducing the rotational speed of the motor (i.e., it does not transfer rotation away from a common axis to reduce the speed, such as is common in externally engaging gear trains, and then transfer it back to drive the output shaft and turn the fastener). Accordingly, speed reduction may be more efficient and the housing may be smaller.

Another benefit of this wrench is that the reduced speed of the clutch case generally increases torque to the output shaft during normal operation for tightening or loosening a fastener. This allows the wrench to turn a fastener a greater amount under normal operation before requiring impacts from the hammers to provide additional torque. Accordingly, the components of the impact drive may be used less and may last longer.

Still another advantage of the illustrated wrench is that the impact drive efficiently provides significant amounts of additional torque when necessary to tighten or loosen fasteners. The hammers are closely held within the guide channels, and much of the impact load on the hammers is therefore supported by the clutch case, which is heavier than the hammers and carries more force to impact the anvils of the output shaft. In addition, rather than moving laterally or radially as a result of the impact with the anvils, the hammers are held rigid by their close fit with the side walls of the guide channels and can therefore transfer substantial force to the anvils and output shaft.

Components of the wrench of this invention are made of a suitable rigid material, such as metal (e.g., cold-forged steel). But a wrench having components made of different materials does not depart from the scope of this invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Moreover, the use of "forward" and "rearward" and variations thereof is made for convenience, but does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A power driven tool for tightening and loosening a mechanical fastener, the tool comprising:

a housing;

a motor in the housing having a motor shaft adapted to be rotated by the motor at a first higher speed;

a reduction gear in the housing operatively connected to the motor shaft, the reduction gear having a reduction gear shaft adapted to be rotated by the reduction gear at a second lower speed that is slower than the first higher speed of rotation of the motor shaft;

an impact drive in the housing operatively connected to the reduction gear shaft, the impact drive having an output shaft disposed for rotation, the impact drive being adapted for intermittently providing an increased torque on the output shaft, a ratchet head assembly operatively connected to the output shaft of the impact drive, the ratchet head assembly including an output member rotatably mounted on the housing and capable of engaging the mechanical fastener, and a ratchet mechanism operable to limit rotation of the output member in one direction.

2. A power driven tool as set forth in claim 1 wherein the ratchet mechanism comprises an oscillating member operatively connected to the output shaft of the impact drive for converting rotary motion of the impact drive output shaft into oscillating motion.

3. A power driven tool as set forth in claim 2 wherein the ratchet mechanism further comprises a pawl driven by the oscillating member for driving rotation of the output member.

4. A power driven tool as set forth in claim 1 wherein the reduction gear comprises a planetary reduction gear.

5. A power driven tool as set forth in claim 4 wherein the planetary reduction gear includes at least three gears.

6. A power driven tool as set forth in claim 5 wherein two of the gears of the planetary reduction gear comprise planet gears and one of the gears is a sun gear.

7. A power driven tool as set forth in claim 6 wherein the motor shaft is located between the planetary gears and is adapted to drive rotation of the planetary gears, the planetary gears being located within the sun gear for traveling along the sun gear upon rotation of the planetary gears by the motor shaft.

8. A power driven tool as set forth in claim 7 wherein the sun gear has a central axis and the motor shaft has an axis of rotation, the central axis of the sun gear being generally coincident with the axis of rotation of the motor shaft.

9. A power driven tool as set forth in claim 8 wherein the output shaft of the impact device has an axis of rotation generally coincident with the axis of rotation of the motor shaft and central axis of the sun gear.

10. A power driven tool as set forth in claim 4 wherein the impact device comprises a clutch case and an impact mechanism disposed in the clutch case.

11. A power driven tool as set forth in claim 1 wherein the motor shaft, reduction gear shaft and output shaft are generally axially aligned.

12. A power driven tool as set forth in claim 1 wherein the motor is a pneumatic motor.

13. A power driven tool as set forth in claim 1 wherein the housing is elongate and generally cylindrical, the housing being sized for being held in one hand.

14. A power driven tool for tightening and loosening a mechanical fastener, the tool comprising:

a housing having first and second longitudinal ends and a longitudinal axis;

a head attached to the housing toward the first longitudinal end of the housing for operatively engaging the mechanical fastener;

a motor disposed in the housing toward the second longitudinal end of the housing for driving the head, the motor having a motor shaft;

a planetary reduction gear located between the motor and the head for reducing rotational speed of the motor transferred to the head, the planetary reduction gear including planetary gears that operatively engage the motor shaft of the motor and conjointly rotate therewith inside a sun gear of the planetary reduction gear; and an impact drive disposed in the housing between the planetary reduction gear and the head and operatively connecting the planetary reduction gear to the head, the impact drive selectively providing increased driving force to the head for tightening or loosening the mechanical fastener.

15. A power driven tool as set forth in claim 14 wherein the planetary reduction gear includes at least three gears.

16. A power driven tool as set forth in claim 15 wherein two of the gears of the planetary reduction gear comprise planet gears and one of the gears is a sun gear.

17. A power driven tool as set forth in claim 16 wherein the motor shaft is located between the planetary gears and is adapted to drive rotation of the planetary gears, the planetary gears being located within the sun gear for traveling along the sun gear upon rotation of the planetary gears by the motor shaft.

18. A power driven tool as set forth in claim 17 wherein the sun gear has a central axis and the motor shaft has an axis of rotation, the central axis of the sun gear being generally coincident with the axis of rotation of the motor shaft.

19. A power driven tool as set forth in claim 18 wherein the output shaft of the impact device has an axis of rotation generally coincident with the axis of rotation of the motor shaft and central axis of the sun gear.

20. A power driven tool as set forth in claim 14 wherein the motor is a pneumatic motor.

21. A power driven tool as set forth in claim 20 wherein the housing includes a handle located toward the second longitudinal end of the housing for grasping to hold the tool in one hand, the handle including an air inlet fitting and a lever for controlling movement of air to the motor.

22. A power driven tool as set forth in claim 14 wherein the head includes a ratchet mechanism.

23. A pneumatic tool for tightening and loosening a mechanical fastener, the tool comprising:

an elongate tubular housing sized for being held in one hand;

a pneumatic motor in the housing having a motor shaft adapted to be rotated by the motor at a first higher speed;

a planetary reduction gear in the housing operatively connected to the motor shaft, the planetary reduction gear having a reduction gear shaft adapted to be rotated by the reduction gear at a second lower speed that is slower than the rotation of the motor shaft;

an impact drive in the housing operatively connected to the reduction gear shaft, the impact drive having an output shaft disposed for rotation relative to the housing, the impact drive being adapted for intermittently providing an increased torque on the output shaft, the motor shaft, reduction gear shaft and the output shaft being generally coaxial; and a ratchet head assembly operatively connected to the output shaft of the impact drive, the ratchet head assembly including an output member rotatably mounted on the housing and capable of engaging the mechanical fastener, and a ratchet mechanism operable to limit rotation of the output member in one direction.

* * * * *